United States Patent
Jung (10) Patent No.: US 7,904,025 B2
(45) Date of Patent: Mar. 8, 2011

(54) METHOD AND SYSTEM FOR TERMINATING PPP SESSION IN DORMANT STATE OF MOBILE COMMUNICATION TERMINAL

(75) Inventor: You-La Jung, Seongnam-Si (KR)

(73) Assignee: Pantech & Curitel Communications, Inc., Seoul (KR)

( * ) Notice: Subject to any disclaimer, the term of this patent is extended or adjusted under 35 U.S.C. 154(b) by 982 days.

(21) Appl. No.: 11/263,858

(22) Filed: Nov. 2, 2005

(65) Prior Publication Data

US 2006/0126557 A1 Jun. 15, 2006

(30) Foreign Application Priority Data

Dec. 9, 2004 (KR) .................. 10-2004-0103715

(51) Int. Cl.
*H04B 7/00* (2006.01)
*H04B 1/16* (2006.01)
*H04W 72/00* (2009.01)
*H04W 4/00* (2009.01)
*G01R 31/08* (2006.01)
*G06F 11/00* (2006.01)
*G06F 15/16* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ................ 455/66.1; 455/343.4; 455/452.2; 455/517; 370/230; 370/249; 370/328; 709/200

(58) Field of Classification Search .................. 455/517, 455/421, 426, 434.2, 434.3, 434.4, 434.5, 455/458, 572, 67.6, 550, 560, 452.2, 502, 455/66.1, 343.4, 343.6, 425, 550.1, 561, 455/574; 470/230, 328, 329, 340, 354, 395, 470/240.1; 370/230, 328, 331, 338, 389, 370/340, 354, 329, 395, 240.1; 709/200, 224, 233

See application file for complete search history.

(56) References Cited

U.S. PATENT DOCUMENTS

| | | | |
|---|---|---|---|
| 6,289,224 B1* | 9/2001 | Boxall et al. .................. | 455/517 |
| 6,856,809 B2* | 2/2005 | Fostick ......................... | 455/466 |
| 6,912,214 B2* | 6/2005 | Madour et al. ................ | 370/340 |
| 7,016,692 B2* | 3/2006 | Rajkotia ..................... | 455/456.2 |
| 7,242,972 B2* | 7/2007 | Harris ........................... | 455/574 |
| 7,272,379 B1* | 9/2007 | Tang et al. .................... | 455/406 |
| 7,437,403 B2* | 10/2008 | Xue et al. ...................... | 709/200 |
| 2001/0031634 A1* | 10/2001 | Mizutani et al. .............. | 455/425 |
| 2002/0172178 A1* | 11/2002 | Suzuki et al. ................. | 370/338 |
| 2004/0022212 A1* | 2/2004 | Chowdhury et al. ......... | 370/329 |
| 2004/0032846 A1* | 2/2004 | Rasanen et al. ............... | 370/338 |
| 2004/0106431 A1* | 6/2004 | Laroia et al. ................ | 455/552.1 |
| 2004/0218556 A1* | 11/2004 | Son et al. ...................... | 370/311 |
| 2004/0266450 A1* | 12/2004 | Chowdhury ............... | 455/452.2 |
| 2005/0021770 A1* | 1/2005 | Helm et al. ................... | 709/228 |
| 2006/0114821 A1* | 6/2006 | Willey et al. ................. | 370/229 |

* cited by examiner

*Primary Examiner* — Andrew Wendell
*Assistant Examiner* — Paul P Tran
(74) *Attorney, Agent, or Firm* — H.C. Park & Associates, PLC (57) ABSTRACT

Disclosed is a PPP session termination system and method in a dormant state of a mobile communication terminal. The PPP session termination system in the dormant state of the mobile communication terminal includes a mobile communication terminal processing module. When the mobile communication terminal enters into the dormant state, the mobile communication terminal processing module transmits a notification message containing time limit information concerning termination of a PPP session between the mobile communication terminal and a mobile communication system to the mobile communication system, and terminates the PPP session of the mobile communication terminal at the expiration of the time limit when there is no data transfer between the mobile communication terminal and the mobile communication system during the time limit.

10 Claims, 3 Drawing Sheets

METHOD AND SYSTEM FOR TERMINATING PPP SESSION IN DORMANT STATE OF MOBILE COMMUNICATION TERMINAL

This application claims the priority of Korean Patent Application No. 2004-103715, filed on Dec. 9, 2004, in the Korean Intellectual Property Office, the disclosure of which is incorporated herein in its entirety by reference.

BACKGROUND OF THE INVENTION

1. Field of the Invention

The present invention relates to a method and system for terminating a PPP session in a dormant state of a mobile communication terminal and, more particularly, to a method and system for terminating a point-to-point (PPP) session in a dormant state of a mobile communication terminal, which is capable of preventing squandering of communication resources caused by reorigination of a physical layer upon termination of the PPP session between the mobile communication terminal and a mobile communication system during the dormant state of the mobile communication terminal.

2. Description of Related Art

When there is no data transmitted or received in a physical layer and a radio link protocol (RLP) layer for a predetermined time interval while a mobile communication terminal uses a data call (a packet data service or a socket data service), i.e. while a mobile communication terminal transmits/receives data to/from a mobile communication system after assignment of a traffic channel, the data call is released, i.e., the physical layer and RLP layer are down.

In the present invention, the socket data implies data transferred between a mobile communication terminal and a mobile communication system while the mobile communication terminal is not connected to a personal computer (PC). The packet data implies data transferred between a PC and a mobile communication system when a mobile communication terminal connected to the PC operates as a modem.

In a case of the socket data, the PPP layer and higher layers in a protocol stack of the mobile communication terminal are working while the physical layer is down. Meanwhile, in a case of the packet data, the PPP layer and higher layers in a protocol stack of the PC connected to the mobile communication and a resource management (RM) interface for interfacing the mobile communication terminal with the PC are working while the physical layer is down.

That is, the dormant state implies that the physical layer is down while a PPP session of the packet data or socket data is maintained.

Once the mobile communication terminal enters into a dormant state, the mobile communication terminal will remain in the dormant state till before reorigination of the physical layer caused by occurrence of data transfer.

However, the dormant state of the mobile communication terminal is not maintained unlimitedly when there is no data transfer in progress. In more detail, when there is no data transfer for a predetermined time interval after entrance into the dormant state, i.e., when there is no data transfer for a predetermined time interval from the start time to the expiration time of a session closure timer initiated at the entrance into the dormant state, or when a termination event occurs prior to the expiration of the session closure timer during the dormant state, the dormant state is released and the data transfer process is completely terminated.

In this case, conventionally, reorigination of a physical layer and reassignment of a traffic channel are performed for termination of the PPP session between the mobile communication system and the mobile communication terminal in the dormant state.

That is, when the session closure timer is expired or the termination event occurs prior to the expiration of the session closure timer during the dormant state of the mobile communication terminal, reorigination of the physical layer and reassignment of the traffic channel are performed and a PPP termination request message is transmitted. According to the PPP termination request message, the PPP session between the mobile communication terminal and the mobile communication system is terminated, resulting in termination of data transfer.

Accordingly, there has been a problem in that upon termination of the PPP session between the mobile communication terminal and the mobile communication system during the dormant state of the mobile communication terminal, reorigination of the physical layer and reassignment of the traffic channel are performed, resulting in squandering of communication resources.

SUMMARY OF THE INVENTION

The present invention provides a method and system for terminating a PPP session in a dormant state of a mobile communication terminal, which is capable of preventing squandering of communication resources caused by reorigination of a physical layer, reallocation of a traffic channel, and transmission of a PPP termination request message upon termination of a PPP session between the mobile communication terminal and a mobile communication system during the dormant state of the mobile communication terminal.

According to an aspect of the present invention, there is provided a PPP session termination system in a dormant state of a mobile communication terminal comprising a mobile communication terminal processing module, wherein when the mobile communication terminal enters into the dormant state, the mobile communication terminal processing module transmits a notification message containing time limit information concerning termination of a PPP session between the mobile communication terminal and a mobile communication system to the mobile communication system, and terminates the PPP session of the mobile communication terminal at the expiration of the time limit when there is no data transfer between the mobile communication terminal and the mobile communication system during the time limit.

Upon occurrence of a termination event in the mobile communication terminal prior to the expiration of the time limit, the mobile communication terminal processing module may terminate the PPP session of the mobile communication terminal, and transmit an SMS message notifying termination of the mobile communication terminal during the dormant state.

The mobile communication terminal processing module may comprise: a dormant state detector for detecting whether or not the mobile communication terminal has entered into the dormant state; a message processor for transmitting a notification message containing time limit information concerning termination of the PPP session between the mobile communication terminal and the mobile communication system to the mobile communication system, when the dormant state detector detects that the mobile communication terminal has entered into the dormant state; a data transfer monitor for monitoring whether or not there is data transferred between the mobile communication terminal and the mobile communication system during the time limit; and a PPP session termination processor for terminating the PPP session of the mobile communication terminal at the expiration of the time limit when the data transfer monitor determines that there has been no data transfer between the mobile communication terminal and the mobile communication system during the time limit.

Upon occurrence of a termination event of the mobile communication terminal prior to the expiration of the time limit, the PPP session termination processor may terminate the PPP session of the mobile communication terminal and transmit a short messaging service (SMS) message notifying the termination of the mobile communication terminal during the dormant state.

The SMS message may be transmitted over an access channel.

According to another aspect of the present invention, there is provided a mobile communication terminal equipped with the PPP session termination system in the dormant state of the mobile communication terminal of claims 1 to 5.

According to another aspect of the present invention, there is provided a PPP session termination system in a dormant state of a mobile communication terminal comprising a mobile communication system processing module, wherein the mobile communication system processing module receives a notification message containing time limit information concerning termination of a PPP session between the mobile communication terminal and a mobile communication system, and terminates the PPP session of the mobile communication system at the expiration of the time limit when there is no data transfer between the mobile communication terminal and the mobile communication system during the time limit.

The mobile communication system processing module may terminate the PPP session of the mobile communication system upon receipt of an SMS message notifying termination of the mobile communication terminal during the dormant state.

The mobile communication system processing module may comprise: a notification message receiver for receiving a notification message containing time limit information concerning termination of the PPP session between the mobile communication terminal and the mobile communication system; a data transfer monitor for monitoring whether or not there is data transferred between the mobile communication terminal and the mobile communication system during the time limit; and a PPP session termination processor for terminating the PPP session of the mobile communication system at the expiration of the time limit when the data transfer monitor determines that there has been no data transfer between the mobile communication terminal and the mobile communication system during the time limit.

Upon receipt of an SMS message notifying termination of the mobile communication terminal during the dormant state, the PPP session termination processor may terminate the PPP session of the mobile communication system.

According to another aspect of the present invention, there is provided a packet data serving node (PDSN) equipped with the PPP session termination system in the dormant state of the mobile communication terminal of claims 7 to 10.

According to another aspect of the present invention, there is provided an inter-working function (IWF) equipped with the PPP session termination system in the dormant state of the mobile communication terminal of claims 7 to 10.

According to another aspect of the present invention, there is provided a PPP session termination method in a dormant state of a mobile communication terminal, the method comprising the steps of: a) detecting whether or not the mobile communication terminal has entered into the dormant state; b) transmitting a notification message containing time limit information concerning termination of a PPP session between the mobile communication terminal and a mobile communication system to the mobile communication system when the mobile communication terminal is determined to have entered into the dormant state in the step a); c) monitoring whether or not there is data transferred between the mobile communication terminal and the mobile communication server during the time limit; and d) terminating the PPP session of the mobile communication terminal at the expiration of the time limit when it is determined that there has been no data transfer between the mobile communication terminal and the mobile communication system during the time limit in the step c)

Upon occurrence of a termination event of the mobile communication terminal prior to the expiration of the time limit, the step d) may further comprise terminating the PPP session of the mobile communication terminal and transmitting an SMS message notifying termination of the mobile communication terminal during the dormant state.

The SMS message may be transmitted over an access channel.

According to another aspect of the present invention, there is provided a PPP session termination method in a dormant state of a mobile communication terminal, the method comprising the steps of: a) receiving a notification message containing time limit information concerning termination of a PPP session between the mobile communication terminal and a mobile communication system; b) monitoring whether or not there is data transferred between the mobile communication terminal and the mobile communication system during the time limit; and c) terminating the PPP session of the mobile communication system at the expiration of the time limit when it is determined that there has been no data transfer between the mobile communication terminal and the mobile communication system during the time limit in the step b).

The step c) may further comprise terminating the PPP session of the mobile communication system upon receipt of an SMS message notifying termination of the mobile communication terminal during the dormant state.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Exemplary embodiments in accordance with the present invention will now be described in detail with reference to the accompanying drawings.

Figure 1:
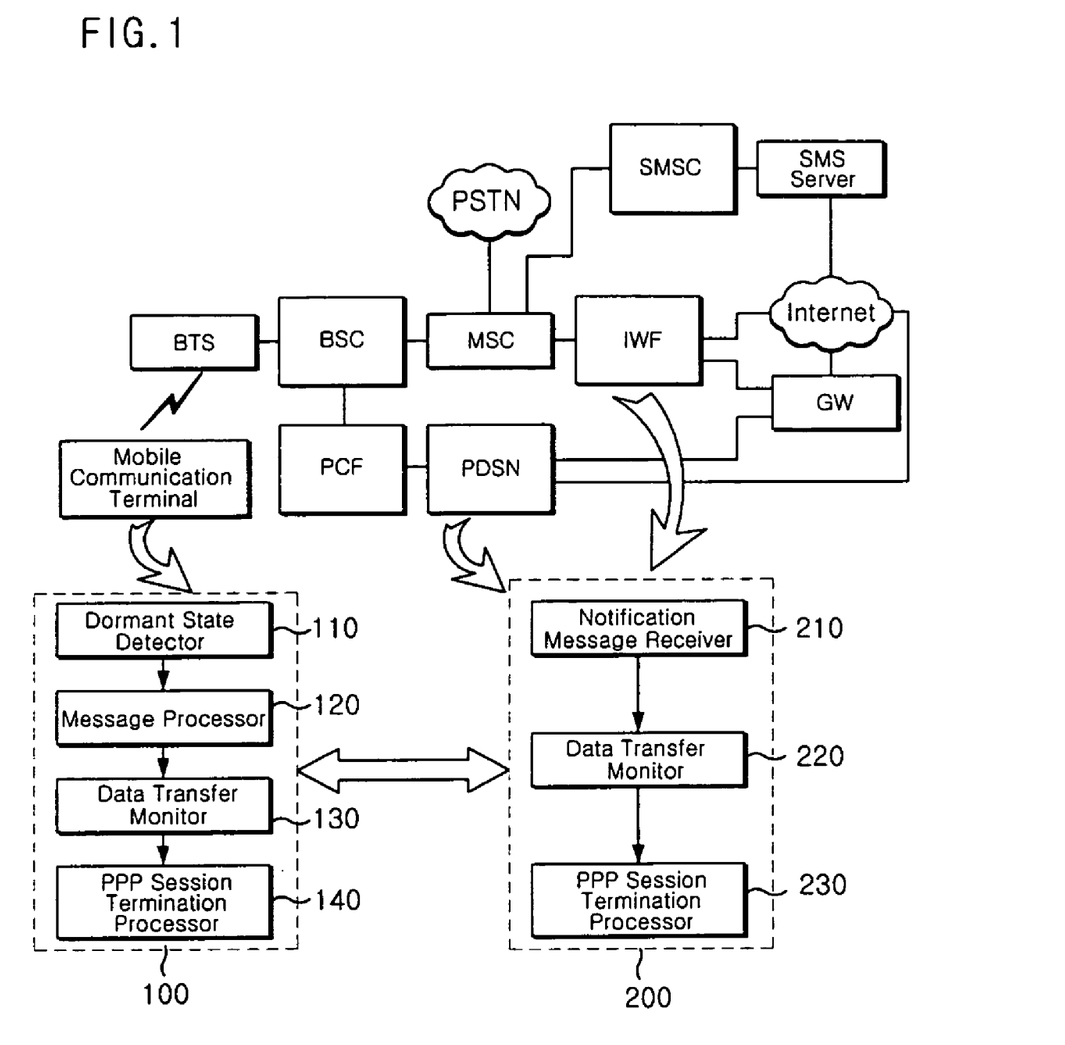
FIG. 1 is a block diagram showing a PPP session termination system in a dormant state of a mobile communication terminal in accordance with an embodiment of the present invention.

FIG. 1 is a block diagram showing a PPP session termination system in a dormant state of a mobile communication terminal in accordance with an embodiment of the present invention.

With reference to FIG. 1, the following abbreviations are used: BTS refers to a base transceiver station; BSC refers to a bases station controller; MSC refers to a mobile switching center, GW refers to a gateway, PSTN refers to a public switched telephone network, and SMS server refers to a short message service center.

A PPP session termination system in a dormant state of a mobile communication terminal according to the present invention comprises a mobile communication terminal processing module 100 which exists in the form of software running in the mobile communication terminal, and a mobile communication system processing module 200 which exists in the form of software running in a packet data serving node (PDSN) or an interworking function (IWF) of a mobile communication system.

Upon entrance of the mobile communication terminal into a dormant state, the mobile communication terminal processing module 100 sends a notification message containing time limit information concerning termination of the PPP session between the mobile communication terminal and the mobile communication system to the mobile communication system. When there is no data transfer between the mobile communication terminal and the mobile communication system during the time limit, the mobile communication terminal processing module 100 terminates the PPP session of the mobile communication terminal at the expiration of the time limit.

At this time, the mobile communication system also terminates the PPP session when there is no data transfer between the mobile communication terminal and the mobile communication system during the time limit. Accordingly, upon termination of the PPP session between the mobile communication terminal and the mobile communication system during the dormant state of the mobile communication terminal, each of the mobile communication terminal and the mobile communication system terminates the PPP session without procedures such as reorigination of a physical layer, reallocation of a traffic channel, and transmission of a PPP termination request message, thereby preventing squandering of communication resources.

Meanwhile, upon occurrence of a termination event of the mobile communication terminal prior to the expiration of the time limit, the mobile communication terminal processing module 100 terminates the PPP session of the mobile communication terminal and sends a short message service (SMS) message notifying the termination of the mobile communication terminal in a dormant state. At this time, the SMS message is preferably sent over an access channel rather than a traffic channel.

The mobile communication system having received the SMS message notifying termination of the mobile communication terminal in the dormant state terminates the PPP session. Accordingly, upon termination of the PPP session between the mobile communication terminal and the mobile communication system during the dormant state of the mobile communication terminal, each of the mobile communication terminal and the mobile communication system terminates the PPP session without procedures such as reorigination of a physical layer, reallocation of a traffic channel, and transmission of a PPP termination request message, thereby preventing squandering of communication resources.

The mobile communication terminal processing module 100 comprises a dormant state detector 110, a message processor 120, a data transfer monitor 130, and a PPP session termination processor 140.

The dormant state detector 110 detects whether or not the mobile communication terminal enters into a dormant state.

When there is no data transmitted or received in a physical layer and a RLP layer for a predetermined time interval while the mobile communication terminal uses a data call (a packet data service or a socket data service) i.e. while the mobile communication terminal transmits/receives data to/from the mobile communication system after assignment of a traffic channel, the mobile communication terminal enters into a dormant state in which the physical layer is down and a PPP session of the packet data or socket data is maintained. The mobile communication terminal processing module 100 detects through the dormant state detector 110 whether or not the mobile communication terminal enters into the dormant state.

When the dormant state detector 110 detects that the mobile communication terminal has entered into the dormant state, the message processor 120 transmits a notification message containing time limit information concerning termination of the PPP session between the mobile communication terminal and the mobile communication system to the mobile communication system.

When the mobile communication terminal enters into the dormant state, the mobile communication terminal processing module 100 transmits a notification message indicating entrance into the dormant state to the mobile communication system through the message processor 120.

At this time, the mobile communication terminal sets a data field ORDQ to 0, the data field indicating a dormant or non-dormant state which is contained in a release order message, and transmits the notification message to the mobile communication system. In the present invention, a data field SCT_VAL for recording time limit information concerning termination of the PPP session between the mobile communication terminal and the mobile communication system is added to the release order message.

The data transfer monitor 130 monitors whether or not data is transferred between the mobile communication terminal and the mobile communication system during the time limit.

The data field SCT_VAL for recording the time limit information concerning termination of the PPP session between the mobile communication terminal and the mobile communication system is one shared by both the mobile communication terminal and the mobile communication system. The mobile communication terminal processing module 100 monitors through the data transfer monitor 130 whether or not there is data transferred between the mobile communication terminal and the mobile communication system during the passage of time recorded in the data field SCT_VAL having the time limit information concerning termination of the PPP session between the mobile communication terminal and the mobile communication system.

When the data transfer monitor 130 determines that there is no data transfer between the mobile communication terminal and the mobile communication system during the time limit, the PPP session termination processor 140 terminates the PPP session of the mobile communication terminal at the expiration of the time limit.

That is, when data transfer occurs between the mobile communication terminal and the mobile communication system during the time limit, the PPP session between the mobile communication terminal and the mobile communication system is maintained. However, when there is no data transfer between the mobile communication terminal and the mobile communication system during the time limit, the mobile communication terminal processing module 100 terminates the PPP session through the PPP session termination processor 140 without reorigination of a physical layer, reallocation of a traffic channel, and transmission of a PPP termination request message.

When there is no data transfer between the mobile communication terminal and the mobile communication system during the passage of time recorded in the data field SCT_VAL having time limit information concerning termination of the PPP session between the mobile communication terminal and the mobile communication system, which is contained in the notification message, the mobile communication system terminates the PPP session of the mobile communication system independently of the mobile communication terminal, thereby preventing unnecessary squandering of communication sources.

Meanwhile, in accordance with another embodiment of the present invention, upon occurrence of a termination event of the mobile communication terminal prior to the expiration of the time limit, the PPP session termination processor 140 preferably terminates the PPP session of the mobile communication terminal and transmits an SMS message notifying termination of the mobile communication terminal in a dormant state.

At this time, the SMS message is preferably transmitted over an access channel rather than a traffic channel so that squandering of communication resources can be minimized.

That is, when a termination event occurs prior to the expiration of the time limit during the dormant state of the mobile communication terminal, for example, due to input of a call termination key by a user, the mobile communication terminal processing module 100 terminates the PPP session of the mobile communication terminal through the PPP session termination processor 140, and transmits to the mobile communication system an SMS message notifying termination of the mobile communication terminal during the dormant state.

The SMS message notifying termination of the mobile communication terminal during the dormant state is transmitted to PDSN or IWF through a short message service center (SMSC) of the mobile communication system, so that the mobile communication system terminates the PPP session. As a result, it is possible to terminate the PPP sessions of the mobile communication terminal and the mobile communication system independently of each other without reorigination of a physical layer, reallocation of a traffic channel, and transmission of a PPP termination request message, thereby preventing unnecessary squandering of communication resources.

Meanwhile, in a case where a PC is not connected to the mobile communication terminal, i.e., in a case of socket data transferred between the mobile communication system and the mobile communication terminal using the PPP layer and higher layers in a protocol stack of the mobile communication terminal rather than the PC, the PPP session of the mobile communication terminal is terminated by processing the PPP layer and higher layers in the protocol stack of the mobile communication terminal. In a case where the PC is connected to the mobile communication terminal, i.e., in a case of packet data transferred between the PC and the mobile communication system, the PPP session of the mobile communication terminal is terminated by processing the PPP layer and higher layers in the protocol stack of the PC and an RM interface for interfacing the mobile communication terminal with the PC.

The mobile communication system processing module 200 receives a notification message containing time limit information concerning termination of the PPP session between the mobile communication terminal and the mobile communication system. When there is no data transfer between the mobile communication terminal and the mobile communication system during the time limit, the mobile communication system processing module 200 terminates the PPP session of the mobile communication system at the expiration of the time limit.

At this time, when there is no data transfer between the mobile communication terminal and the mobile communication system during the time limit, the mobile communication terminal having transmitted the notification message also terminates the PPP session at the expiration of the time limit. As a result, upon termination of the PPP session between the mobile communication terminal and the mobile communication system during the dormant state of the mobile communication terminal, each of the mobile communication terminal and the mobile communication system terminates the PPP session without reorigination of a physical layer, reallocation of a traffic channel, and transmission of a PPP termination request message, thereby preventing squandering of communication resources.

Meanwhile, the mobile communication system processing module 200 terminates the PPP session of the mobile communication system upon receipt of an SMS message notifying termination of the mobile communication terminal during the dormant state.

At this time, the mobile communication terminal having transmitted the SMS message notifying termination of the mobile communication terminal during the dormant state terminates the PPP session. As a result, when the PPP session between the mobile communication terminal and the mobile communication system is terminated during the dormant state of the mobile communication terminal, each of the mobile communication terminal and the mobile communication system terminates the PPP session without reorigination of a physical layer, reallocation of a traffic channel, and transmission of a PPP termination request message, thereby preventing squandering of communication resources.

The mobile communication system processing module 200 comprises a notification message receiver 210, a data transfer monitor 220, and a PPP session termination processor 230.

The notification message receiver 210 receives a notification message containing time limit information concerning termination of the PPP session between the mobile communication terminal and the mobile communication system.

When the mobile communication terminal enters into a dormant state, the mobile communication terminal sets a data field ORDQ to 0, the data field indicating a dormant or non-dormant state which is contained in a release order message, adds a data field SCT_VAL for recording time limit information concerning termination of the PPP session between the mobile communication terminal and the mobile communication system to the release order message, and transmits the notification message to the notification message receiver 210 of the mobile communication system processing module 200.

The data transfer monitor 220 monitors whether or not there is data transferred between the mobile communication terminal and the mobile communication system during the time limit.

The mobile communication system processing module 200 having received the notification message monitors by means of the data transfer monitor 220 whether or not data is transferred between the mobile communication terminal and the mobile communication system during the passage of time recorded in the field SCT_VAL for recording the time limit information concerning termination of the PPP session between the mobile communication terminal and the mobile communication system.

When the data transfer monitor 220 determines that there is no data transfer between the mobile communication terminal and the mobile communication system during the time limit, the PPP session termination processor 230 terminates the PPP session of the mobile communication system at the expiration of the time limit.

That is, when data transfer occurs between the mobile communication terminal and the mobile communication system during the time limit, the PPP session between the mobile communication terminal and the mobile communication system is maintained. However, when there is no data transfer between the mobile communication terminal and the mobile communication system during the time limit, the mobile communication system processing module 200 terminates the PPP session of the mobile communication system independently of the mobile communication terminal without reorigination of a physical layer, reallocation of a traffic channel, and transmission of a PPP termination request message.

Accordingly, when there is no data transfer between the mobile communication terminal and the mobile communication system during the passage of time recorded in the data field SCT_VAL for recording time limit information concerning termination of the PPP session between the mobile communication terminal and the mobile communication system, which is contained in the notification message, the mobile communication system terminates the PPP session of the mobile communication system independently of the mobile communication terminal, thereby preventing unnecessary squandering of communication sources.

Meanwhile, in accordance with another embodiment of the present invention, the PPP session termination processor 230 preferably terminates the PPP session of the mobile communication system, upon receipt of an SMS message notifying termination of the mobile communication terminal during the dormant state.

That is, when a termination event occurs prior to the expiration of the time limit during the dormant state of the mobile communication terminal, for example, due to input of a call termination key by a user, the mobile communication terminal processing module 100 terminates the PPP session of the mobile communication terminal through the PPP session termination processor 140, and transmits to the mobile communication system an SMS message notifying termination of the mobile communication terminal during the dormant state.

The SMS message is transmitted to PDSN or IWF through an SMSC of the mobile communication system. The mobile communication system processing module 200 terminates the PPP session of the mobile communication system through the PPP session termination processor 230, upon receipt of the SMS message notifying termination of the mobile communication terminal during the dormant state. As a result, it is possible to terminate the PPP session of the mobile communication system independently of the mobile communication terminal without reorigination of a physical layer, reallocation of a traffic channel, and transmission of a PPP termination request message, thereby preventing unnecessary squandering of communication resources.

Operation of the PPP session termination system in the dormant state of the mobile communication terminal having the above-mentioned construction in accordance with the present invention will now be described.

Figure 2:
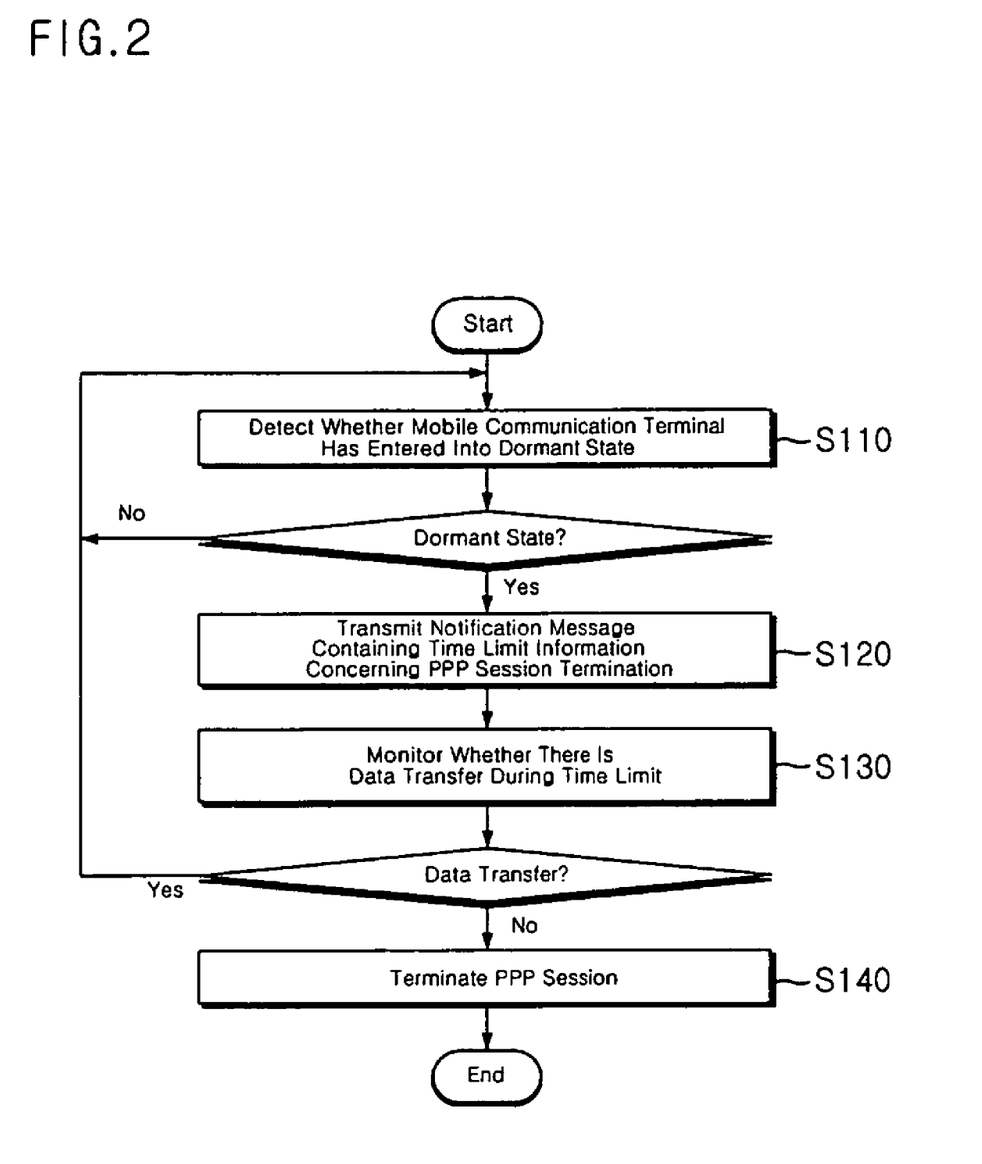
FIG. 2 is a flow chart showing a PPP session termination method in a dormant state of a mobile communication terminal, which is performed in the mobile communication terminal, in accordance with an embodiment of the present invention.

FIG. 2 is a flowchart showing a PPP session termination method in a dormant state of a mobile communication terminal, which is performed in the mobile communication terminal, in accordance with an embodiment of the present invention.

First, in step S110, the mobile communication terminal processing module 100 detects through the dormant state detector 110 whether or not the mobile communication terminal enters into a dormant state.

When there is no data transmitted or received in a physical layer and a RLP layer for a predetermined time interval while the mobile communication terminal uses a data call (a packet data service or a socket data service), i.e. while the mobile communication terminal transmits/receives data to/from the mobile communication system after assignment of a traffic channel, the mobile communication terminal enters into a dormant state in which a physical layer is down and a PPP session of the packet data or socket data is maintained. In step S110, it is detected whether or not the mobile communication terminal has entered into the dormant state by means of the dormant state detector 110.

Next, in step S120, when it is detected that the mobile communication terminal has entered into the dormant state in step S110, the mobile communication terminal processing module 100 transmits through the message processor 120 to the mobile communication system a notification message notifying that the mobile communication terminal has entered into the dormant state and containing time limit information concerning termination of the PPP session between the mobile communication terminal and the mobile communication system.

At this time, in step S120, the message processor 120 sets a data field ORDQ to 0, the data field indicating a dormant or non-dormant state which is contained in a release order message, adds a data field SCT_VAL for recording time limit information concerning termination of the PPP session between the mobile communication terminal and the mobile communication system to the release order message, and transmits the notification message to the mobile communication system.

Subsequently, in step S130, the mobile communication terminal processing module 100 monitors through the data transfer monitor 130 whether or not data is transferred between the mobile communication terminal and the mobile communication system during the time limit.

The data field SCT_VAL for recording the time limit information concerning termination of the PPP session between the mobile communication terminal and the mobile communication system is one shared by both the mobile communication terminal and the mobile communication system. In step S130, the mobile communication terminal processing module 100 monitors through the data transfer monitor 130 whether or not there is data transferred between the mobile communication terminal and the mobile communication system during the passage of time recorded in the data field SCT_VAL having the time limit information concerning termination of the PPP session between the mobile communication terminal and the mobile communication system.

When it is determined in step S130 that there is no data transfer between the mobile communication terminal and the mobile communication system during the time limit, in step S140, the mobile communication terminal processing module 100 terminates the PPP session of the mobile communication terminal at the expiration of the time limit through the PPP session termination processor 140.

That is, when data transfer occurs between the mobile communication terminal and the mobile communication system during the time limit, the PPP session between the mobile communication terminal and the mobile communication system is maintained. However, when there is no data transfer between the mobile communication terminal and the mobile communication system during the time limit, the mobile communication terminal processing module 100 terminates the PPP session of the mobile communication terminal through the PPP session termination processor 140 in step S140 without reorigination of a physical layer, reallocation of a traffic channel, and transmission of a PPP termination request message.

When there is no data transfer between the mobile communication terminal and the mobile communication system during the passage of time recorded in the data field SCT_VAL having time limit information concerning termination of the PPP session between the mobile communication terminal and the mobile communication system, which is contained in the notification message, the mobile communication system terminates the PPP session of the mobile communication system independently of the mobile communication terminal, thereby preventing unnecessary squandering of communication sources.

Meanwhile, in accordance with another embodiment of the present invention, in step S140, upon occurrence of a termination event of the mobile communication terminal prior to the expiration of the time limit, it is preferable that the PPP session of the mobile communication terminal is terminated and an SMS message notifying termination of the mobile communication terminal during the dormant state is transmitted.

At this time, the SMS message is preferably transmitted over an access channel rather than a traffic channel so that squandering of communication resources can be minimized.

That is, when a termination event occurs prior to the expiration of the time limit during the dormant state of the mobile communication terminal, for example, due to input of a call termination key by a user, in step S140, the mobile communication terminal processing module 100 terminates the PPP session of the mobile communication terminal through the PPP session termination processor 140, and transmits to the mobile communication system an SMS message notifying termination of the mobile communication terminal during the dormant state.

The SMS message notifying termination of the mobile communication terminal during the dormant state is transmitted to PDSN or IWF through an SMSC of the mobile communication system, so that the mobile communication system terminates the PPP session. As a result, it is possible to terminate the PPP sessions of the mobile communication terminal and the mobile communication system independently of each other without reorigination of a physical layer, reallocation of a traffic channel, and transmission of a PPP termination request message, thereby preventing unnecessary squandering of communication resources.

Figure 3:
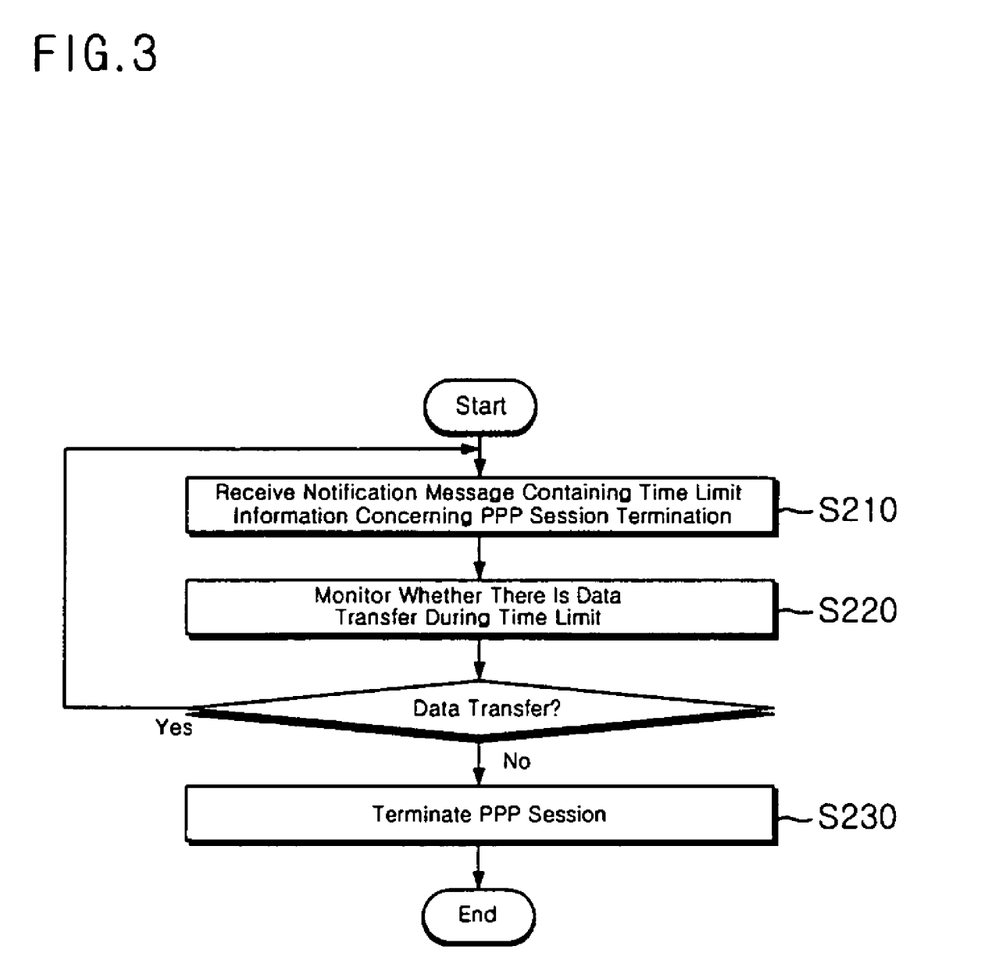
FIG. 3 is a flow chart showing a PPP session termination method in a dormant state of a mobile communication terminal, which is performed in a mobile communication system, in accordance with another embodiment of the present invention.

FIG. 3 is a flowchart showing a PPP session termination method in a dormant state of a mobile communication terminal, which is performed in a mobile communication system, in accordance with another embodiment of the present invention.

In step S210, the mobile communication system processing module 200 receives through the notification message receiver 210 a notification message containing time limit information concerning termination of the PPP session between the mobile communication terminal and the mobile communication system.

When the mobile communication terminal enters into the dormant state, the mobile communication terminal sets a data field ORDQ to 0, the data field indicating a dormant or nondormant state which is contained in a release order message, adds a data field SCT_VAL for recording time limit information for termination of the PPP session between the mobile communication terminal and the mobile communication system to the release order message, and transmits the notification message. In step S210, the mobile communication system processing module 200 receives the notification message through the notification message receiver 210.

In step S220, the mobile communication system processing module 200 monitors through the data transfer monitor 220 whether or not data is transferred between the mobile communication terminal and the mobile communication system during the time limit.

That is, in step S220, the mobile communication system processing module 200 having received the notification message monitors by means of the data transfer monitor 220 whether or not data is transferred between the mobile communication terminal and the mobile communication system during the passage of time recorded in the data field SCT_VAL for recording the time limit information concerning termination of the PPP session between the mobile communication terminal and the mobile communication system.

When it is determined in step S220 that there is no data transfer between the mobile communication terminal and the mobile communication system during the time limit, in step S230, the mobile communication system processing module 200 terminates the PPP session of the mobile communication system through the PPP session termination processor 230 at the expiration of the time limit.

That is, when data transfer occurs between the mobile communication terminal and the mobile communication system during the time limit, the PPP session between the mobile communication terminal and the mobile communication system is maintained. However, when there is no data transfer between the mobile communication terminal and the mobile communication system during the time limit, in step S230, the mobile communication system processing module 200 terminates the PPP session of the mobile communication system through the PPP session termination processor 230 without reorigination of a physical layer, reallocation of a traffic channel, and transmission of a PPP termination request message.

Accordingly, when there is no data transfer between the mobile communication terminal and the mobile communication system during the passage of time recorded in the data field SCT_VAL for recording time limit information concerning termination of the PPP session between the mobile communication terminal and the mobile communication system, which is contained in the notification message, the mobile communication system terminates the PPP session of the mobile communication system independently of the mobile communication terminal, thereby preventing unnecessary squandering of communication sources.

Meanwhile, in accordance with another embodiment of the present invention, the mobile communication system processing module 200 preferably terminates the PPP session of the mobile communication system through the PPP session termination processor 230 in step S230, upon receipt of the SMS message notifying termination of the mobile communication terminal during the dormant state.

That is, when a termination event occurs prior to the expiration of the time limit during the dormant state of the mobile communication terminal, for example, due to input of a call termination key by a user, in step S230, the mobile communication terminal processing module 100 terminates the PPP session of the mobile communication terminal through the PPP session termination processor 140, and transmits to the mobile communication system an SMS message notifying termination of the mobile communication terminal during the dormant state.

The SMS message is transmitted to PDSN or IWF through an SMSC of the mobile communication system. The mobile communication system processing module 200 terminates the PPP session of the mobile communication system through the PPP session termination processor 230, upon receipt of the SMS message notifying termination of the mobile communication terminal during the dormant state. As a result, it is possible to terminate the PPP session of the mobile communication system independently of the mobile communication terminal without reorigination of a physical layer, reallocation of a traffic channel, and transmission of a PPP termination request message, thereby preventing unnecessary squandering of communication resources.

As apparent from the above description, according to a PPP session termination system and method in a dormant state of a mobile communication terminal in accordance with the present invention, upon termination of the PPP session between the mobile communication terminal and the mobile communication system during the dormant state of the mobile communication terminal, both the mobile communication terminal and the mobile communication system terminate the PPP sessions independently of each other without reorigination of a physical layer, reallocation of a traffic channel, and transmission of a PPP termination request message, thereby preventing squandering of communication resources and occurrence of traffic charges due to the reallocation of the traffic channel.

While the present invention has been described with reference to exemplary embodiments thereof, it will be understood by those skilled in the art that various changes in form and details may be made therein without departing from the scope of the present invention as defined by the following claims.

What is claimed is:

1. A PPP (Point-to-Point Protocol) session termination system for responding to a dormant state of a mobile communication terminal, comprising:
    a mobile communication terminal processing module,
    wherein if the mobile communication terminal enters into the dormant state, the mobile communication terminal processing module transmits a notification message containing time limit information including a time limit of a PPP session between the mobile communication terminal and a mobile communication system to the mobile communication system, and terminates the PPP session of the mobile communication terminal at the expiration of the time limit if there is no data transfer between the mobile communication terminal and the mobile communication system during the time limit,
    wherein, upon occurrence of a termination event in the mobile communication terminal prior to the expiration of the time limit, the mobile communication terminal processing module terminates the PPP session of the mobile communication terminal, and transmits an SMS (short message service) message notifying the termination of the PPP session by the mobile communication terminal during the dormant state,
    wherein the PPP session is established between the mobile communication terminal to a Packet Data Serving Node (PDSN) or an InterWorking Function (IWF) of the mobile communication system, and
    wherein the time limit is used in setting the expiration of the PPP session.

2. The PPP session termination system of claim 1, wherein the mobile communication terminal processing module comprises:
    a dormant state detector to detect whether the mobile communication terminal has entered into the dormant state;
    a message processor to transmit the notification message containing the time limit information including the time limit of the PPP session between the mobile communication terminal and the mobile communication system to the mobile communication system, if the dormant state detector detects that the mobile communication terminal has entered into the dormant state;
    a data transfer monitor to monitor whether there is data transferred between the mobile communication terminal and the mobile communication system during the time limit; and
    a PPP session termination processor to terminate the PPP session of the mobile communication terminal at the expiration of the time limit if the data transfer monitor determines that there has been no data transfer between the mobile communication terminal and the mobile communication system during the time limit.

3. The PPP session termination system of claim 2, wherein upon occurrence of the termination event of the mobile communication terminal prior to the expiration of the time limit, the PPP session termination processor terminates the PPP session of the mobile communication terminal and transmits the SMS (short message service) message notifying the termination of the PPP session by the mobile communication terminal during the dormant state.

4. The PPP session termination system of claim 1, wherein the SMS message is transmitted over an access channel.

5. A PPP (Point-to-Point Protocol) session termination system for responding to a dormant state of a mobile communication terminal, comprising:
    a mobile communication system processing module,
    wherein if the mobile communication terminal enters into the dormant state, the mobile communication system processing module receives a notification message containing time limit information including a time limit of a PPP session between the mobile communication terminal and a mobile communication system, and terminates the PPP session of the mobile communication system at the expiration of the time limit if there is no data transfer between the mobile communication terminal and the mobile communication system during the time limit,
    wherein the mobile communication system processing module terminates the PPP session of the mobile communication system upon receipt of an SMS (short message service) message notifying the termination of the PPP session by the mobile communication terminal during the dormant state,
    wherein the PPP session is established between the mobile communication terminal to a Packet Data Serving Node (PDSN) or an InterWorking Function (IWF) of the mobile communication system, and
    wherein the time limit is used in setting the expiration of the PPP session.

6. The PPP session termination system of claim 5, wherein the mobile communication system processing module comprises:
    a notification message receiver to receive the notification message containing time limit information including the time limit of the PPP session between the mobile communication terminal and the mobile communication system;

a data transfer monitor to monitor whether there is data transferred between the mobile communication terminal and the mobile communication system during the time limit; and a PPP session termination processor to terminate the PPP session of the mobile communication system at the expiration of the time limit if the data transfer monitor determines that there has been no data transfer between the mobile communication terminal and the mobile communication system during the time limit.

7. The PPP session termination system of claim 6, wherein upon receipt of the SMS (short message service) message notifying the termination of the PPP session by the mobile communication terminal during the dormant state, the PPP session termination processor terminates the PPP session of the mobile communication system.

8. A PPP (Point-to-Point Protocol) session termination method for responding to a dormant state of a mobile communication terminal, comprising:
   a) detecting whether the mobile communication terminal has entered into the dormant state;
   b) transmitting a notification message containing time limit information including a time limit of a PPP session between the mobile communication terminal and a mobile communication system from the mobile communication terminal to the mobile communication system if the mobile communication terminal is determined to have entered into the dormant state in the step a);
   c) monitoring whether there is data transferred between the mobile communication terminal and the mobile communication server during the time limit; and
   d) terminating the PPP session of the mobile communication terminal at the expiration of the time limit if it is determined that there has been no data transfer between the mobile communication terminal and the mobile communication system during the time limit in the step c),
   wherein upon occurrence of a termination event of the mobile communication terminal prior to the expiration of the time limit, the step d) further comprises:
   terminating the PPP session of the mobile communication terminal and transmitting an SMS (short message service) message notifying the termination of the PPP session by the mobile communication terminal during the dormant state,
   wherein the PPP session is established between the mobile communication terminal to a Packet Data Serving Node (PDSN) or an InterWorking Function (IWF) of the mobile communication system, and
   wherein the time limit is used in setting the expiration of the PPP session.

9. The PPP session termination method of claim 8, wherein the SMS message is transmitted over an access channel.

10. A PPP (Point-to-Point Protocol) session termination method for responding to a dormant state of a mobile communication terminal, comprising:
   a) receiving a notification message containing time limit information including a time limit of a PPP session between the mobile communication terminal and a mobile communication system from the mobile communication terminal if the mobile communication terminal has entered into the dormant state;
   b) monitoring whether there is data transferred between the mobile communication terminal and the mobile communication system during the time limit; and
   c) terminating the PPP session of the mobile communication system at the expiration of the time limit if it is determined that there has been no data transfer between the mobile communication terminal and the mobile communication system during the time limit in the step b),
   wherein the step c) further comprises:
   terminating the PPP session of the mobile communication system upon receipt of an SMS (short message service) message notifying the termination of the PPP session by the mobile communication terminal during the dormant state,
   wherein the PPP session is established between the mobile communication terminal to a Packet Data Serving Node (PDSN) or an InterWorking Function (IWF) of the mobile communication system, and
   wherein the time limit is used in setting the expiration of the PPP session.

* * * * *